United States Patent
Nagae

(10) Patent No.: US 10,710,166 B2
(45) Date of Patent: Jul. 14, 2020

(54) CUTTING TOOL HOLDER, CUTTING TOOL, AND METHOD OF MANUFACTURING MACHINED PRODUCT USING THEM

(71) Applicant: KYOCERA CORPORATION, Kyoto-shi, Kyoto (JP)

(72) Inventor: Shin Nagae, Yasu (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/327,341

(22) PCT Filed: Aug. 18, 2017

(86) PCT No.: PCT/JP2017/029606
§ 371 (c)(1),
(2) Date: Feb. 22, 2019

(87) PCT Pub. No.: WO2018/038010
PCT Pub. Date: Mar. 1, 2018

(65) Prior Publication Data
US 2019/0240738 A1    Aug. 8, 2019

(30) Foreign Application Priority Data

Aug. 22, 2016 (JP) .................................. 2016-161803

(51) Int. Cl.
*B23B 27/10* (2006.01)
*B23C 5/28* (2006.01)
*B23B 27/16* (2006.01)

(52) U.S. Cl.
CPC .......... *B23B 27/10* (2013.01); *B23B 27/1614* (2013.01); *B23B 2250/12* (2013.01)

(58) Field of Classification Search
CPC ..... B23Q 11/10; B23B 2250/12; B23B 27/10; Y10T 407/14; Y10T 407/23; B23C 5/28
See application file for complete search history.

(56) References Cited

U.S. PATENT DOCUMENTS 5,439,327 A    8/1995 Wertheim
8,439,609 B2 *  5/2013 Woodruff ................ B23C 5/109
                                                              407/11

(Continued)

FOREIGN PATENT DOCUMENTS

EP    0791420 A1 *  8/1997 ............. B23B 27/10
EP    0791420 A1    8/1997

(Continued)

*Primary Examiner* — Sara Addisu
(74) *Attorney, Agent, or Firm* — Viering, Jentschura & Partner MBB

(57) ABSTRACT

A cutting tool holder may include an upper surface; a first side surface; a second side surface adjacent to the first side surface; a pocket opening into the upper surface, the first side surface, and the second side surface; a first portion located lower than the pocket and protruded outward from the first side surface; and a flow path including an inflow port and an outflow port. The first side surface may include a first recess. The flow path may include a first outflow port opening into the first portion as the outflow port and a first flow path extending from the first outflow port into the holder. The first outflow port is located at a region of the first portion corresponding to the first recess.

15 Claims, 15 Drawing Sheets

(56) References Cited

U.S. PATENT DOCUMENTS

| | | | | |
|---|---|---|---|---|
| 9,656,324 B2* | 5/2017 | Boissonnet | ............ | B23B 29/043 |
| 9,925,596 B2* | 3/2018 | Johansson | ............. | B23B 27/143 |
| 10,052,694 B2* | 8/2018 | Musil | ...................... | B23B 27/10 |
| 10,201,862 B2* | 2/2019 | Kachler | ..................... | B23C 5/28 |
| 2008/0124180 A1* | 5/2008 | Breisch | ................... | B23B 27/10 |
| | | | | 407/110 |
| 2016/0368061 A1 | 12/2016 | Harif | | |
| 2017/0368612 A1 | 12/2017 | Imai et al. | | |

FOREIGN PATENT DOCUMENTS

| | | | | | |
|---|---|---|---|---|---|
| JP | H05237706 | A | | 9/1993 | |
| JP | 09183002 | A | * | 7/1997 | |
| JP | 10076404 | A | * | 3/1998 | |
| JP | H1076404 | A | | 3/1998 | |
| JP | 2014231097 | A | * | 12/2014 | |
| JP | 2014231097 | A | | 12/2014 | |
| WO | 2014207747 | A2 | | 12/2014 | |
| WO | 2016117461 | A1 | | 7/2016 | |
| WO | WO-2016117461 | A1 | * | 7/2016 | ............. B23B 27/10 |

\* cited by examiner

CUTTING TOOL HOLDER, CUTTING TOOL, AND METHOD OF MANUFACTURING MACHINED PRODUCT USING THEM

CROSS-REFERENCE TO RELATED APPLICATIONS

This application is a national stage entry according to 35 U.S.C. 371 of PCT Application No. PCT/JP2017/029606 filed on Aug. 18, 2017, which claims priority to Japanese Application No. 2016-161803 filed on Aug. 22, 2016, which are entirely incorporated herein by reference.

TECHNICAL FIELD

The present disclosure relates to a cutting tool holder, a cutting tool, and a method of manufacturing a machined product using them.

BACKGROUND

Various cutting tools with a coolant supply mechanism have been proposed. Cutting tools designed to supply a coolant to a flank surface of a cutting edge part have also been proposed (refer to, for example, Patent document 1, Patent Document 1: Japanese Unexamined Patent Publication No. 10-76404).

SUMMARY

In a non-limiting aspect of the present disclosure, a cutting tool holder may include an upper surface; a first side surface; a second side surface adjacent to the first side surface; a pocket opening into the upper surface, the first side surface, and the second side surface; a first portion located lower than the pocket and protruded outward from the first side surface; and a flow path that may include an inflow port and an outflow port. The first side surface may include a first recess. The flow path may include a first outflow port opening into the first portion as the outflow port and a first flow path extending from the first outflow port toward inward of the holder. The first outflow port may be located at a region of the first portion corresponding to the first recess.

In a non-limiting aspect of the present disclosure, a cutting tool may include the cutting tool holder, and a cutting insert located at the pocket.

In a non-limiting aspect of the present disclosure, a method of manufacturing a machined product may include rotating a workpiece, bringing the cutting tool into contact with the workpiece being rotated, and moving the cutting tool away from the workpiece.

DETAILED DESCRIPTION

<Cutting Tool Holder>

Figure 1:
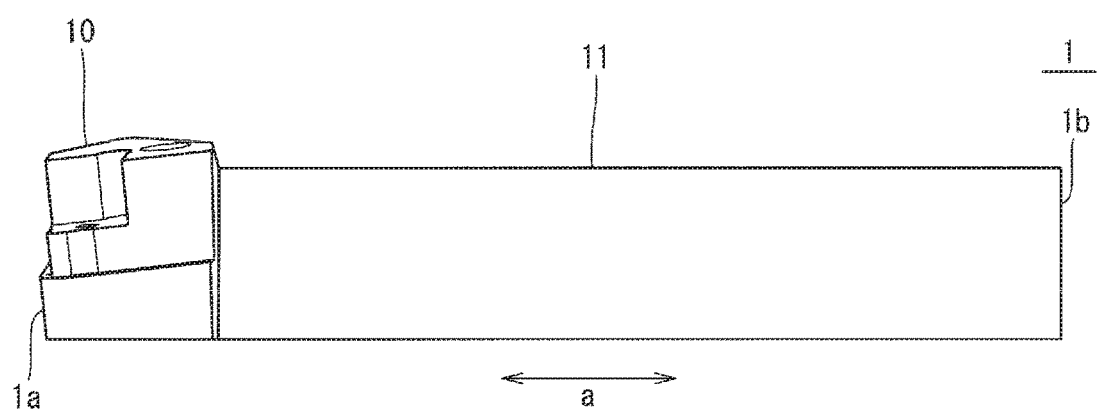
FIG. 1 is a side view illustrating a cutting tool holder in a first non-limiting embodiment of the present disclosure.

The cutting tool holders in various non-limiting aspects of the present disclosure are described in detail below with reference to the drawings. For the sake of description, each of the drawings referred to in the following illustrates, in a simplified form, only main members necessary for description. Hence, the cutting tool holders in the present disclosure are capable of including any structural member not illustrated in the drawings referred to. Dimensions of the members in each of the drawings are not ones which faithfully represent dimensions of actual structural members and dimension ratios of these members. These points are also true for a cutting tool and a method of manufacturing a machined product described later.

First Non-Limiting Embodiment

The cutting tool holder 1 (hereinafter also referred to as "the holder 1") in the first non-limiting embodiment has a shape extending from a first end 1a to a second end 1b as illustrated in FIG. 1. In other words, the holder 1 has a columnar shape. The holder 1 in the first non-limiting embodiment has an approximately quadrangular prism shape. The approximately quadrangular prism shape is a concept including not only a strict quadrangular prism shape but also those having slight irregularities or curves. The shape of the holder 1 is not limited to the approximately quadrangular prism shape.

The holder 1 includes a head 10 located at a side of the first end 1a and a shank 11 located at a side of the second end 1b. The head 10 is a part designed to attach thereto a cutting insert 110 described later (hereinafter also referred to as "the insert 110"). The shank 11 is a part designed to be held by a machine tool. In order to make clear configurations and effects, surfaces of the insert 110 (an upper surface 111, a lower surface 112, and a side surface 113) are also described by being indicated by reference numerals in the following description.

The holder 1 includes an upper surface 2, a first side surface 3, a second side surface 4, a pocket 5, a first portion 6, and a flow path 7 as illustrated in FIGS. 2 to 7. The holder 1 also includes a lower surface 12 in the first non-limiting embodiment as illustrated in FIG. 8. The upper surface 2 and the lower surface 12 are used for the sake of convenience and do not indicate an upper direction and a lower direction, respectively. For example, the upper surface 2 may not be a surface directed upward when using the holder 1. This is also true for the upper surface 111 and the lower surface 112 of the insert 110 described later.

Figure 2:
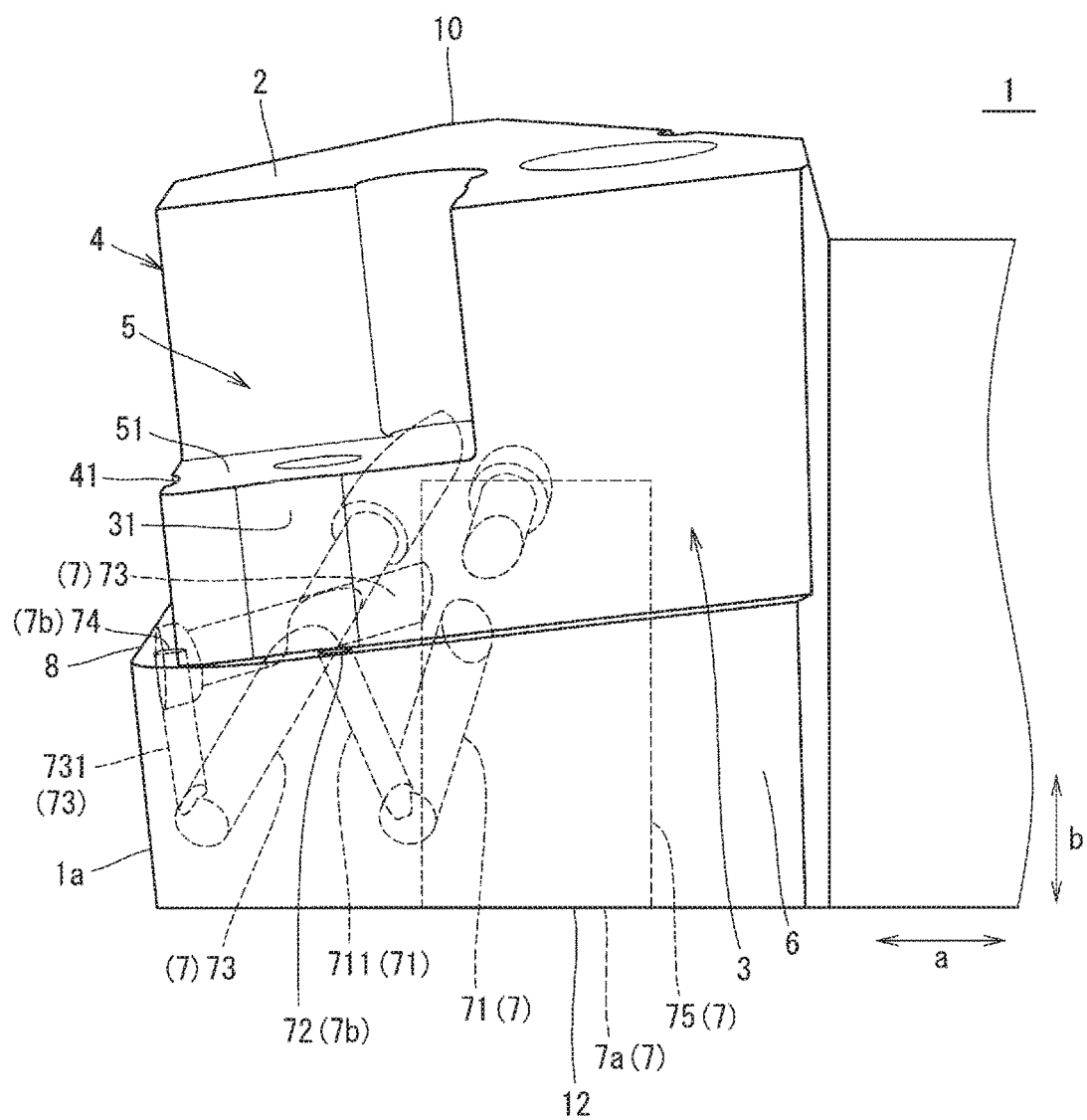
FIG. 2 is a side view enlargedly illustrating a side of a first end of the cutting tool holder in FIG. 1.

The upper and lower directions denote, for example, a direction "b" approximately vertical to a longitudinal direction "a" of the holder 1 illustrated in FIG. 2. Specifically, in cases where a direction from inside the holder 1 toward the upper surface 2 is taken as positive and a reverse direction thereof is taken as negative, a positive side in the direction "b" is the upper direction and a negative side in the direction "b" is the lower direction. The term "inward in the holder 1" denotes a direction toward an interior of the holder 1, and the term "outward in the holder 1" denotes a reverse direction of an inward direction in the holder 1.

The upper surface 2, the first side surface 3, and the second side surface 4 are located at the head 10 in the first non-limiting embodiment. The first side surface 3 is located along the longitudinal direction "a" of the holder 1. The second side surface 4 is a surface that is adjacent to the first side surface 3 and located correspondingly to the direction "b". More specifically, the first side surface 3 is approximately parallel to the longitudinal direction "a", and the second side surface 4 is inclined relative to the direction "b" in the first non-limiting embodiment.

The pocket 5 is a portion that opens into the upper surface 2, the first side surface 3, and the second side surface 4. The pocket 5 is located at the head 10 in the first non-limiting embodiment. The pocket 5 includes a mounting part 51 which corresponds to the location of the insert 110 and is designed to mount the insert 110 thereon.

The first portion 6 is located lower than the pocket 5 and protruded outward from the first side surface 3. The first portion 6 is located at the head 10 in the first non-limiting embodiment.

The flow path 7 functions as a portion that permits flow of a coolant (cooling fluid). Examples of the coolant include water-insoluble cutting fluids and water-soluble cutting fluids. Examples of the water-insoluble cutting fluids include oil-based cutting fluids, inert extreme pressure-based cutting fluids and active extreme pressure-based cutting fluids. Examples of the water-soluble cutting fluids include emulsion-type, soluble-type and solution-type cutting fluids.

The flow path 7 is the portion including an inflow port 7a and an outflow port 7b. The inflow port 7a is a portion that permits introduction of the coolant supplied from the outside into the flow path 7. The inflow port 7a opens into the lower surface 12 of the holder 1 in the first non-limiting embodiment as illustrated in FIG. 8. An opening position or shape of the inflow port 7a is not limited to that in the first non-limiting embodiment, but is suitably selectable depending on the shape of the holder 1 and the shape of a coolant inflow mechanism. The outflow port 7b is a portion that permits outflow of the coolant toward the insert 110. The outflow port 7b is described in detail later.

The first side surface 3 includes a first recess 31 in the first non-limiting embodiment as illustrated in FIGS. 2 to 7. The flow path 7 includes a first outflow port 72 and a first flow path 71. The first outflow port 72 opens into the first portion 6 as the outflow port 7b, and the first flow path 71 extends from the first outflow port 72 toward inward of the holder 1. The first outflow port 72 is located at a region of the first portion 6 corresponding to the first recess 31. With these configurations, the first flow path 71 and the first outflow port 72 that are the coolant supply mechanism can be configured integrally with the holder 1. This leads to a simple configuration of the holder 1 including the coolant supply mechanism, and also leads to enhanced strength of the holder 1. Additionally, because the first outflow port 72 is located at the region of the first portion 6 corresponding to the first recess 31, restrictions exerted on a diameter of the first outflow port 72 is reducible while decreasing a pull-out width of the first portion 6 from the first side surface 3. Hence, when the coolant is supplied to the first flow path 71 to cause the coolant to flow out from the first outflow port 72, the coolant can sufficiently, mainly be supplied to the side surface 113 described later in the insert 110. The holder 1 is consequently capable of achieving a good cooling function while ensuring strength and a degree of freedom for design. A diameter of the first outflow port 72 is settable to, for example, 0.5-2 mm.

Figure 6:
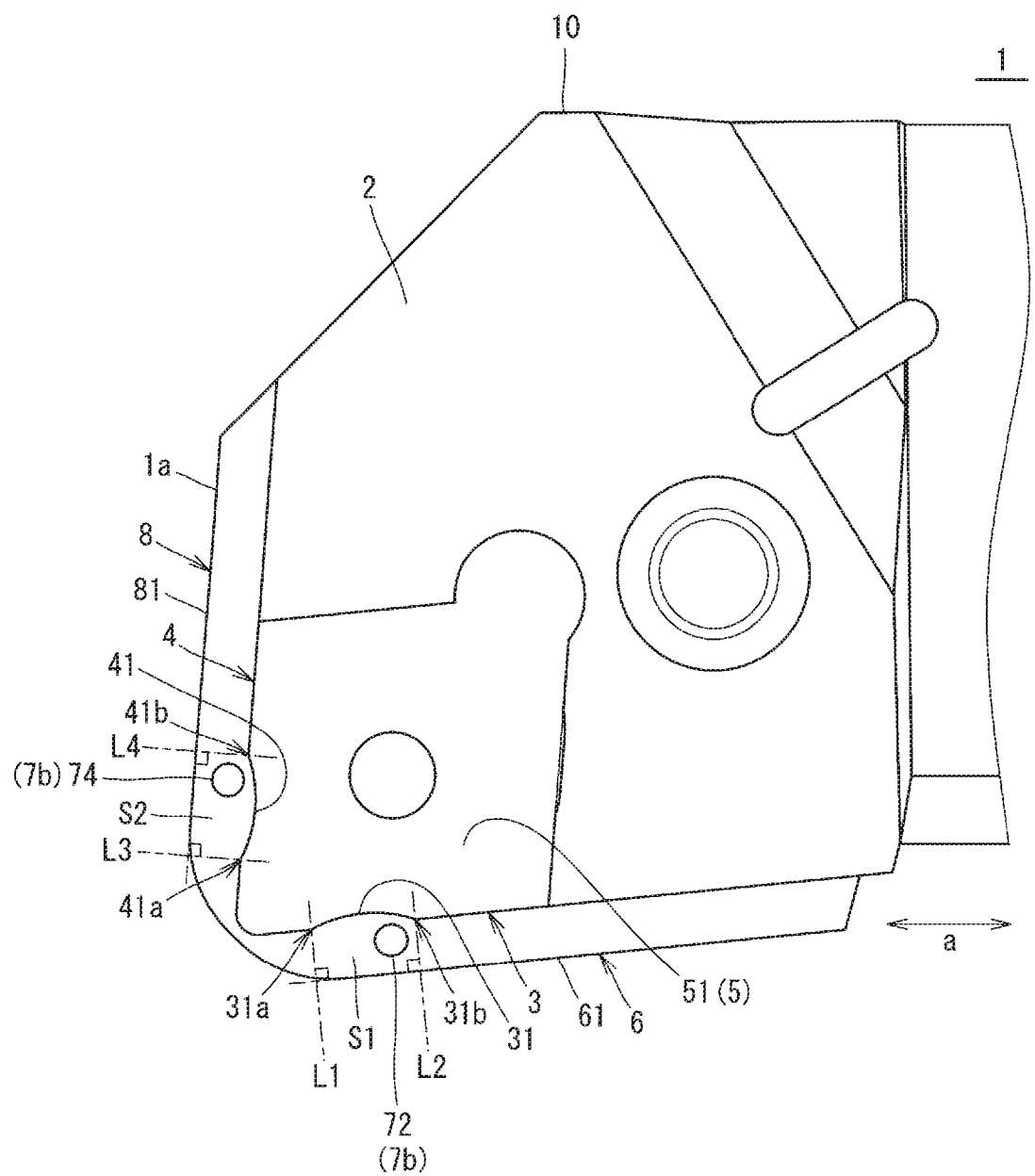
FIG. 6 is a top view enlargedly illustrating a side of the first end of the cutting tool holder in FIG. 1.

The region of the first portion 6 corresponding to the first recess 31 can denote the following region. As illustrated in FIG. 6, the first recess 31 is a recessed portion including a first end part 31a and a second end part 31b in a top view. The first end part 31a is an end located at a side close to the second side surface 4 in the first recess 31, and the second end part 31b is an end located at a side away from the second side surface 4 in the first recess 31 in the top view. The phrase "in a top view" denotes a state obtained when viewed toward a side of the upper surface 2 of the holder 1. A straight line passing through the first end part 31a and being orthogonal to an outer edge 61 of the first portion 6 is referred to as a straight line L1, and a straight line passing through the second end part 31b and being orthogonal to the outer edge 61 is referred to as a straight line L2 in the top view. A region S1 of the first portion 6 surrounded by the first recess 31, the outer edge 61, and the straight lines L1 and L2 corresponds to the region of the first portion 6 corresponding to the first recess 31 in the top view. Further, a configuration in which the first outflow port 72 is located in the region S1 can be taken that the first outflow port 72 is located correspondingly to the first recess 31 in the first portion 6.

As illustrated in FIGS. 2 to 7, the holder 1 may include a second portion 8 located lower than the pocket 5 and protruded outward from the second side surface 4 in the first non-limiting embodiment. Here, the second side surface 4 may include a second recess 41. The flow path 7 may include a second outflow port 74 and a second flow path 73. The second outflow port 74 may open into the second portion 8 as the outflow port 7b, and the second flow path 73 may extend from the second outflow port 7b toward the inward of the holder 1. The second outflow port 74 may be located at a region of the second portion 8 corresponding to the second recess 41. When satisfying these configurations, the coolant can also be suitably flown out from the second outflow port 74 besides the first outflow port 72 as in the case with the first outflow port 72 described above. This leads to a good cooling function while ensuring the strength and degree of freedom for design of the holder 1.

The region of the second portion 8 corresponding to the second recess 41 can be defined in the same manner as the above-mentioned region of the first portion 6 corresponding to the first recess 31. That is, as illustrated in FIG. 6, the second recess 41 is a recessed portion including a third end part 41a and a fourth end part 41b in the top view. The third end part 41a is an end located at a side close to the first side surface 3 in the second recess 41, and the fourth end part 41b is an end located at a side away from the first side surface 3 in the second recess 41 in the top view. A straight line passing through the third end part 41a and being orthogonal to an outer edge 81 of the second portion 8 is referred to as a straight line L3, and a straight line passing through the fourth end part 41b and being orthogonal to the outer edge 81 is referred to as a straight line L4 in the top view. A region S2 of the second portion 8 surrounded by the second recess 41, the outer edge 81, and the straight lines L3 and L4 corresponds to the region of the second portion 8 corresponding to the second recess 41 in the top view. A configuration in which the second outflow port 74 is located in the region S2 can be taken that the second outflow port 74 is located correspondingly to the second recess 41 in the second portion 8.

The second portion 8 is located at the head 10 in the first non-limiting embodiment. The first portion 6 and the second portion 8 are line-symmetrical to a bisector of an angle formed by the first portion 6 and the second portion 8 (a bisector of an angle formed by the first side surface 3 and the second side surface 4) in the top view. Further, the first recess 31 and the second recess 41 are also line-symmetrical to the bisector, and the first outflow port 72 and the second outflow port 74 are also line-symmetrical to the bisector in the top view.

The second portion 8, the second recess 41, the second flow path 73, and the second outflow port 74 may or may not have the same configurations as the first portion 6, the first recess 31, the first flow path 71, and the first outflow port 72, respectively. The second portion 8, the second recess 41, the second flow path 73, and the second outflow port 74 have the same configurations as the first portion 6, the first recess 31, the first flow path 71, and the first outflow port 72, respectively. Unless otherwise specified below, descriptions of the first portion 6, the first recess 31, the first flow path 71, and the first outflow port 72 are applicable to descriptions of the second portion 8, the second recess 41, the second flow path 73, and the second outflow port 74, respectively.

Figure 7:
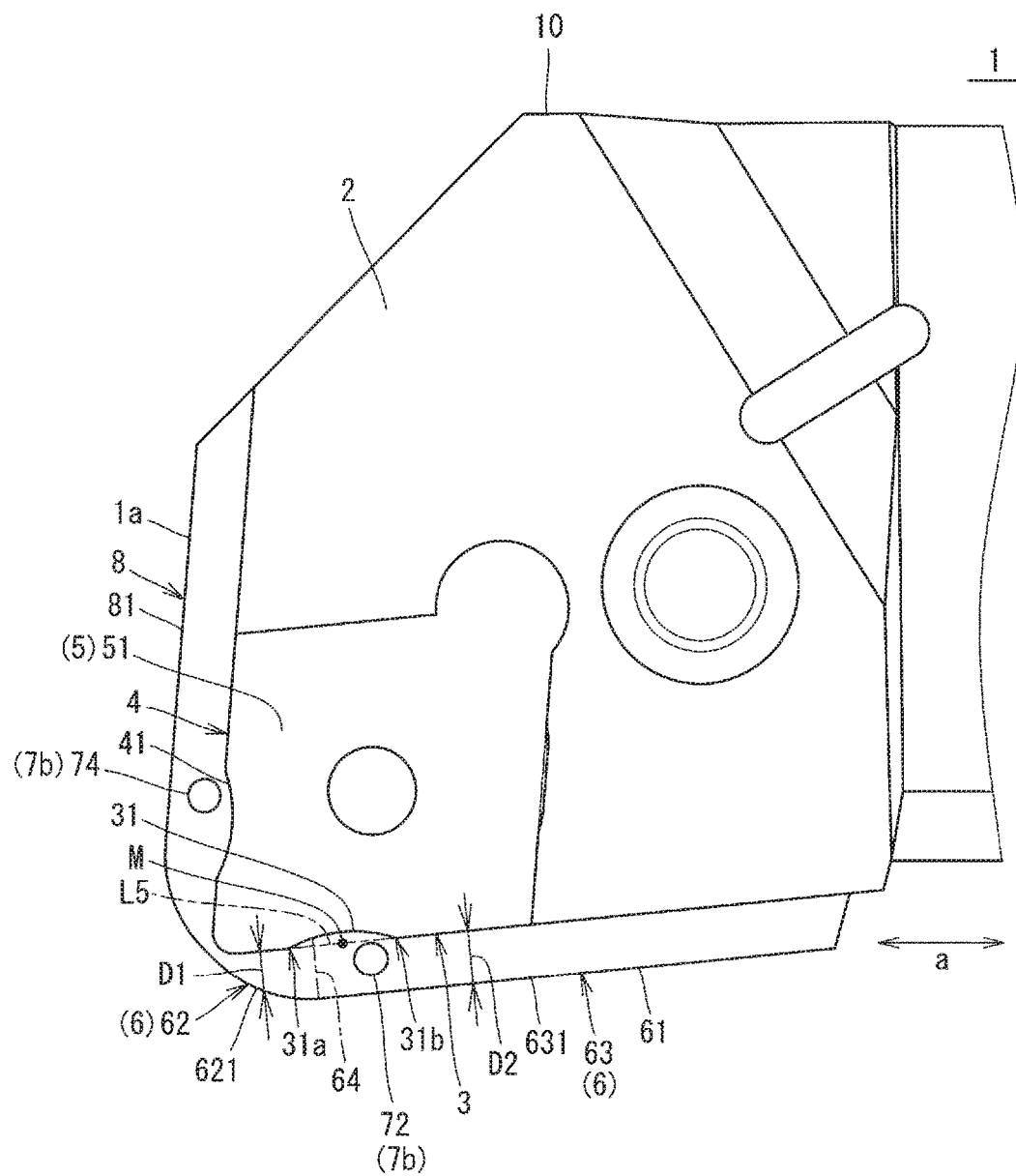
FIG. 7 is a top view enlargedly illustrating a side of the first end of the cutting tool holder in FIG. 1.
Figure 8:
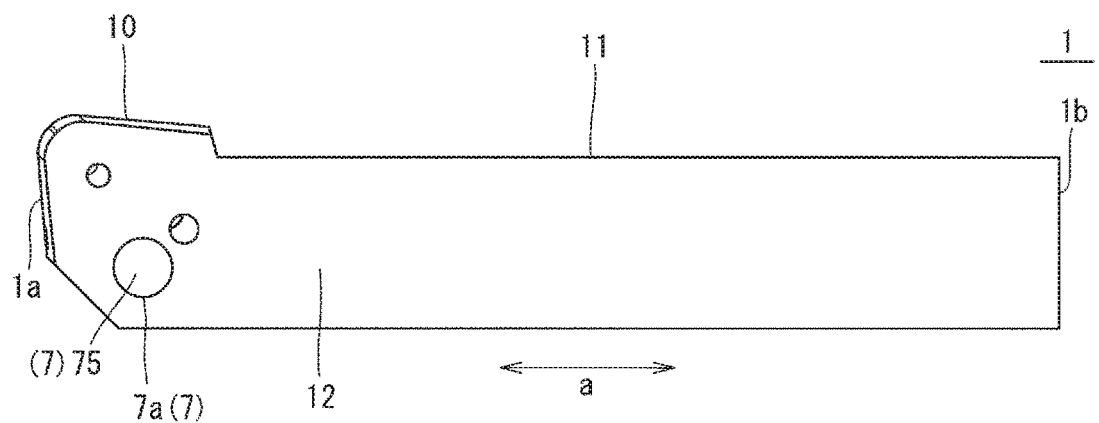
FIG. 8 is a bottom view illustrating the cutting tool holder in FIG. 1.

As illustrated in FIG. 7, the first outflow port 72 may be located closer to a side of the second end part 31b than a midpoint M of a straight line L5 connecting the first end part 31a and the second end part 31b of the first recess 31 in the top view. When satisfying this configuration, dimensions of the first recess 31 can be reduced even when a flow direction of the coolant to be flown out from the first outflow port 72 is set to a direction in which the coolant can be stably supplied to the side surface 113 of the insert 110 as described later. This contributes to ensuring the strength of the holder 1, particularly, strength of the pocket 5 of the holder 1 while enhancing the cooling effect by the coolant.

The first recess 31 may have the following shape. That is, the first recess 31 may have a curvilinear shape in the top view. When satisfying this configuration, the strength of the holder 1 can be ensured while achieving a smooth outflow of the coolant. Examples of the curvilinear shape include parabola shape, elliptic arc shape, and circular arc shape.

The first recess 31 may have the circular arc shape in the top view in the first non-limiting embodiment. When satisfying this configuration, the effect of ensuring the strength of the holder 1 can be enhanced while achieving a smooth outflow of the coolant, and it is easy to machine the holder 1.

Alternatively, as illustrated in FIG. 2, the first recess 31 may have a shape extending from the first portion 6 to the mounting part 51 of the pocket 5 in a side view of the holder 1 (in the plan view of the first side surface 3). The phrase that "in a side view of the holder 1" denotes a state in which the holder 1 is viewed from a side of the first side surface 3.

The first flow path 71 may include an outflow region 711 which extends from the first outflow port 72 and is located at the first portion 6. The outflow region 711 may be inclined upward as going toward the second side surface 4. Specifically, the outflow region 711 may be inclined upward as going toward the first end 1a of the holder 1. When satisfying these configurations, it is possible to ensure a great length of a flow path along an outflow direction of the coolant to be flown out from the first outflow port 72. This leads to a stable supply of the coolant to the side surface 113 of the insert 110.

The outflow region 711 may be located continuously with the first outflow port 72, and may extend in a straight line shape in the first non-limiting embodiment. These configurations contribute to stabilizing a flow direction of the coolant to be flown out from the first outflow port 72, thereby stably supplying the coolant to the side surface 113 of the insert 110.

The second flow path 73 may also include the foregoing configuration for the outflow region 711 of the first flow path 71. That is, the second flow path 73 may include an outflow region 731 which extends from the second outflow port 74 and is located at the second portion 8. The outflow region 731 may be inclined upward as going toward the first side surface 3. The outflow region 731 may be located continuously with the second outflow port 74, and may extend in a straight-line shape in the first non-limiting embodiment.

Figure 3:
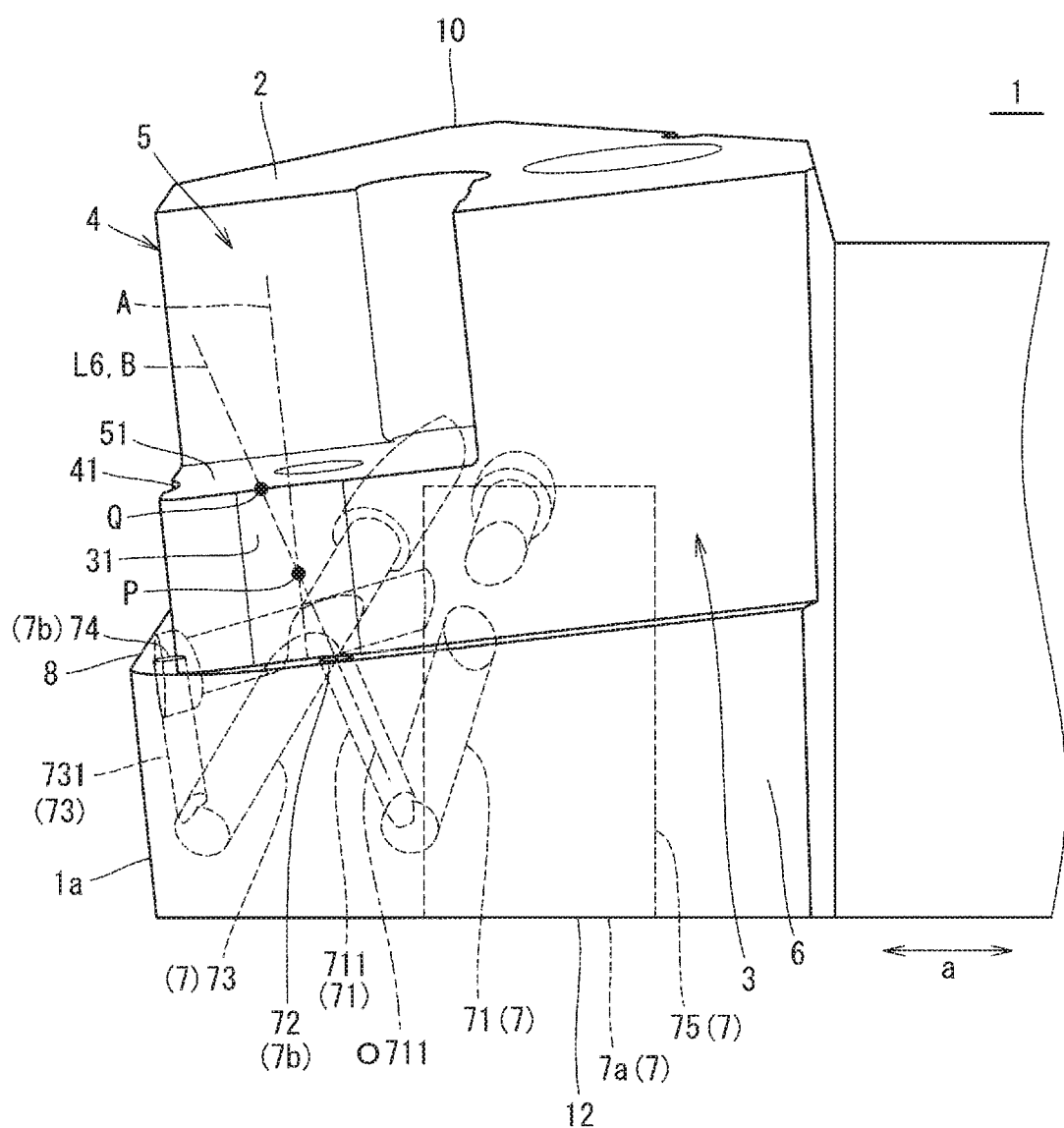
FIG. 3 is a side view enlargedly illustrating a side of the first end of the cutting tool holder in FIG. 1.
Figure 4:
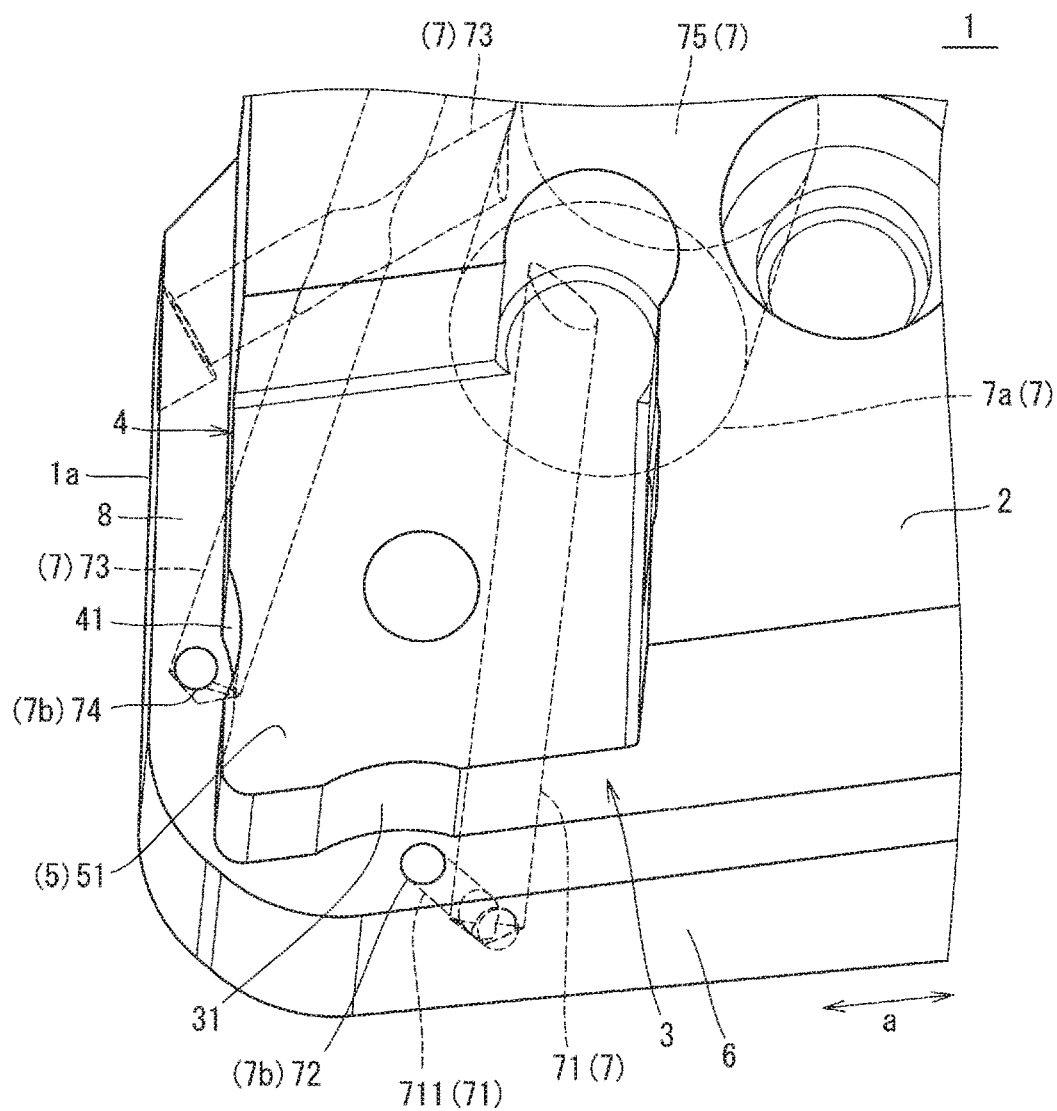
FIG. 4 is a perspective view enlargedly illustrating a side of the first end of the cutting tool holder in FIG. 1.
Figure 5:
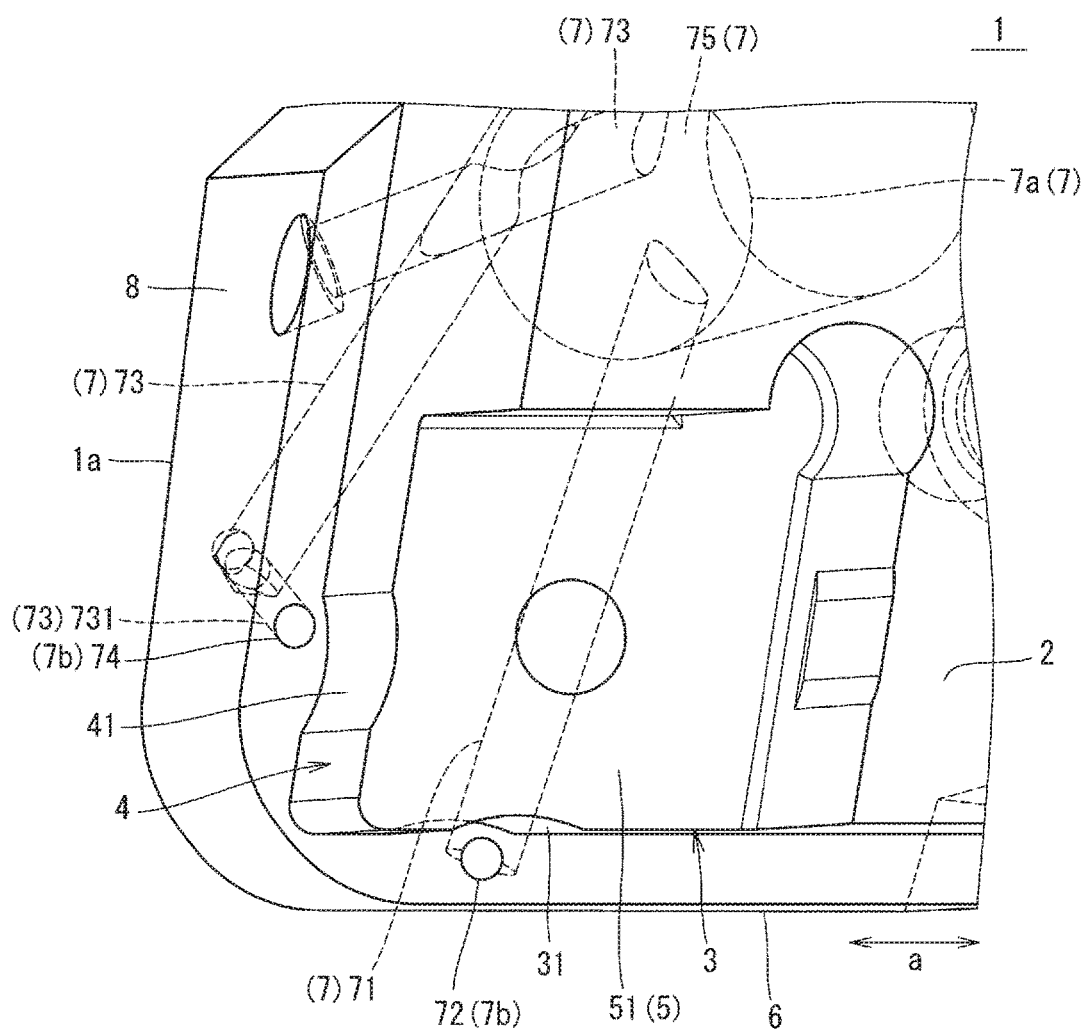
FIG. 5 is a perspective view enlargedly illustrating a side of the first end of the cutting tool holder in FIG. 1 when viewed from a different direction from FIG. 4.

As illustrated in FIG. 3, the first recess 31 may extend along a first direction A from the first portion 6 toward the pocket 5 in the plan view of the first side surface 3. The first direction A in the first recess 31 may intersect with a second direction B in which the outflow region 711 is inclined in the plan view of the first side surface 3. When satisfying this configuration, it is easy to manufacture the holder 1, and a length of the outflow region 711 can be increased to enhance the function of injecting the coolant in a desired direction. This consequently leads to both cost reduction in the holder 1 and improvement in coolant function. An intersection point P of the first direction A in the first recess 3 and the second direction B in the outflow region 711 may be located in the first recess 31 in the plan view of the first side surface 3.

The first direction A is a direction along a line connecting a midpoint at a lower end of the first recess 31 (an intersection with the first portion 6) and a midpoint at an upper end of the first recess 31 (an intersection with the mounting part 51) in the first non-limiting embodiment as illustrated in FIG. 3. The second direction B is a direction along a central axis O711 of the outflow region 711.

In cases where a line obtained by causing the central axis O711 of the outflow region 711 to extend outwardly of the holder 1 is referred to as an imaginary line L6 in a plan view of the first side surface 3, the imaginary line L6 may pass through the first recess 31. Specifically, the imaginary line L6 may intersect with the upper end of the first recess 31 (the intersection with the mounting part 51) at an intersection point Q. When satisfying this configuration, it is easy to machine the outflow region 711. The imaginary line L6 corresponds to the outflow direction of fluid to be flown out from the first outflow port 72. The central axis O711 of the outflow region 711 is obtainable, for example, by successively arranging a center of an inner diameter of the outflow region 711. The central axis O711 is parallel to the second direction B in the first non-limiting embodiment.

The first portion 6 may include a region in which a distance between the first side surface 3 and the outer edge 61 of the first portion 6 decreases as going toward the second side surface 4. Specifically, the first portion 6 may include a first region 61 and a second region 62 as illustrated in FIG. 7. The first region 61 is located at a side of the second side surface 4. The second region 63 connects to the first region 62 and is located farther from the second side surface 4 than the first region 61. A distance D1 between the first side surface 3 and an outer edge 621 of the first region 62 may decrease as going toward the second side surface 4, and a distance D2 between the first side surface 3 and an outer edge 631 of the second region 63 may be kept constant in the top view. When satisfying these configurations, the holder 1 is less likely to interfere with a workpiece while achieving a good cooling function during a cutting process.

The distance D1 may be, for example, 0.5-2 mm. The distance D2 may be, for example, 1-5 mm. The outer edge 621 of the first region 62 may have a curvilinear shape, or alternatively may have a circular-arcuate shape in the top view.

A boundary part 64 between the first region 62 and the second region 63 is located at a region of the first portion corresponding to the first recess 31 in the top view in the first non-limiting embodiment. More specifically, the boundary part 64 is located closer to a side of the second side surface 3 than the midpoint M of the straight line in the first recess 31 in the top view. The position of the boundary part 64 is not limited thereto.

The flow path 7 includes a main flow path 75 in the first non-limiting embodiment as illustrated in FIGS. 2 to 5. The main flow path 75 is located continuously with the inflow port 7a and extends upward from the inflow port 7a. The first flow path 71 and the second flow path 73 are located continuously with the main flow path 75.

No particular limitations are placed on the shape of the flow path 7 insofar as it is possible to permit flow of the coolant. The first flow path 71, the second flow path 73, and the main flow path 75 are circular in cross-section orthogonal to the flow direction of the coolant in the first non-limiting embodiment. An inner diameter of each of the first flow path 71 and the second flow path 73 may be, for example, 1-4 mm. An inner diameter of the main flow path 75 may be, for example, 3-12 mm.

The flow path 7 is formable, for example, by a drilling process using a drill or the like. A part of a hole formed by the drilling process which does not serve as the flow path 7 may be closed with a sealing member in order to prevent leak of the coolant in a non-limiting aspect of the present disclosure. Examples of the sealing member include solder, resin and a screw member.

For example, steel, cast iron, or aluminum alloy is usable as a material of the holder 1. Dimensions of the holder 1 are, for example, settable to the following values. A length of the holder 1 in a direction parallel to the longitudinal direction "a" of the holder 1 is, for example, 32-500 mm. A width of the holder 1 in a direction vertical to the longitudinal direction "a" is, for example, 10-50 mm.

Second Non-Limiting Embodiment

Figure 9:
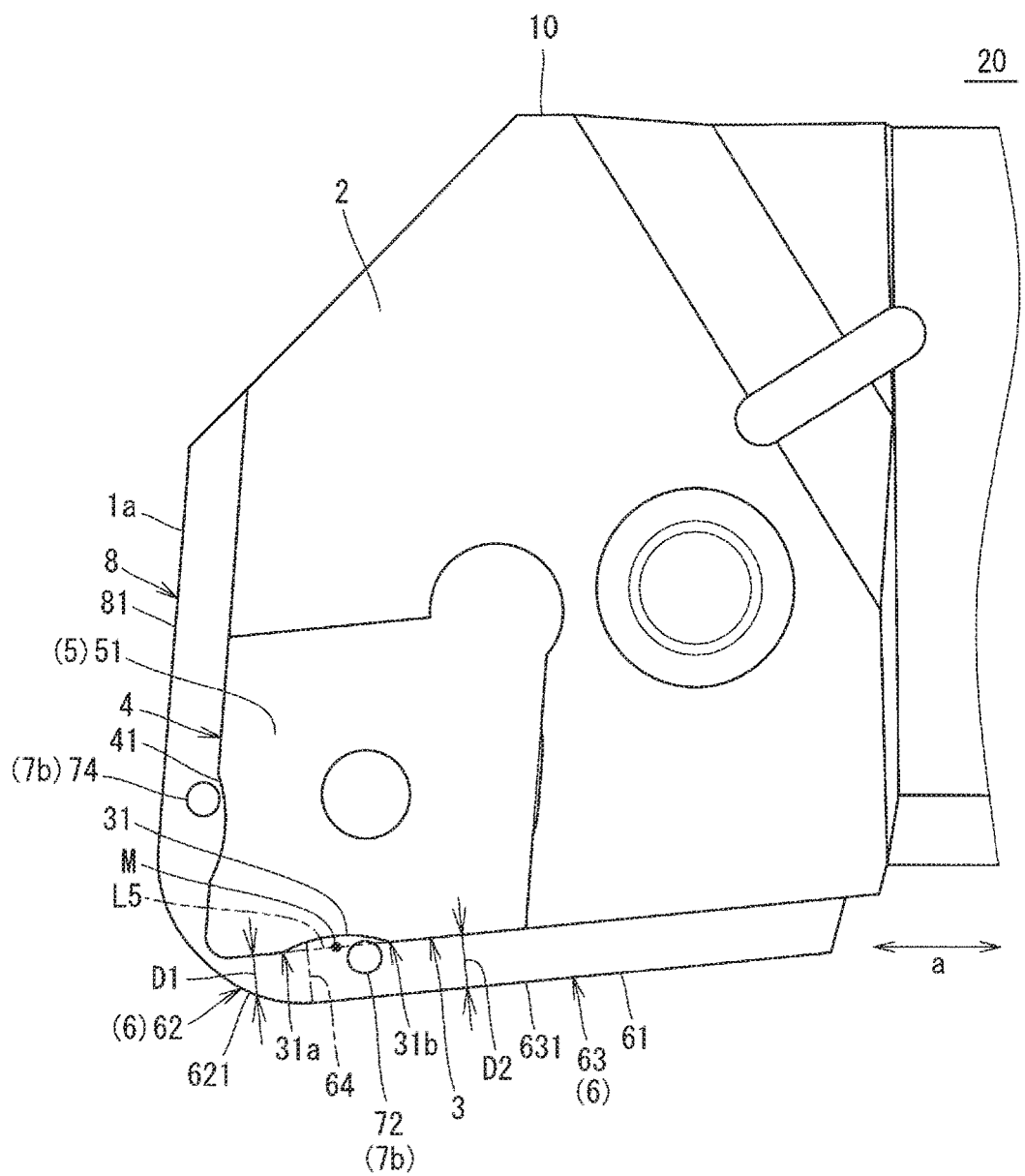
FIG. 9 is a diagram illustrating a cutting tool holder in a second non-limiting embodiment of the present disclosure, which corresponds to FIG. 7 in the first non-limiting embodiment.

A cutting tool holder in the second non-limiting embodiment of the present disclosure is described in detail with reference to FIG. 9. The following description is focused on parts different from those in the first non-limiting embodiment. Descriptions of parts having the same configuration as the first non-limiting embodiment are omitted by referring to the descriptions in the first non-limiting embodiment.

In the cutting tool holder 20 (hereinafter also referred to as "the holder 20") in the second non-limiting embodiment illustrated in FIG. 9, a first outflow port 72 may have the following configuration. A part of the first outflow port 72 may be located in a first recess 31 in a top view. When satisfying this configuration, space between the first outflow port 72 and an outer edge 61 of a first portion 6 can be ensured while decreasing a diameter of the first outflow port 72. Consequently, strength of the holder 20 can be retained while achieving a good cooling function. The term "being in the first recess 31" denotes being in a region surrounded by the first recess 31 and a straight line connecting a first end part 31a and a second end part 31b of the first recess 31 in the top view.

<Cutting Tool>

The cutting tool according to a non-limiting aspect of the present disclosure is described in detail below with reference to FIGS. 10 to 12.

Figure 10:
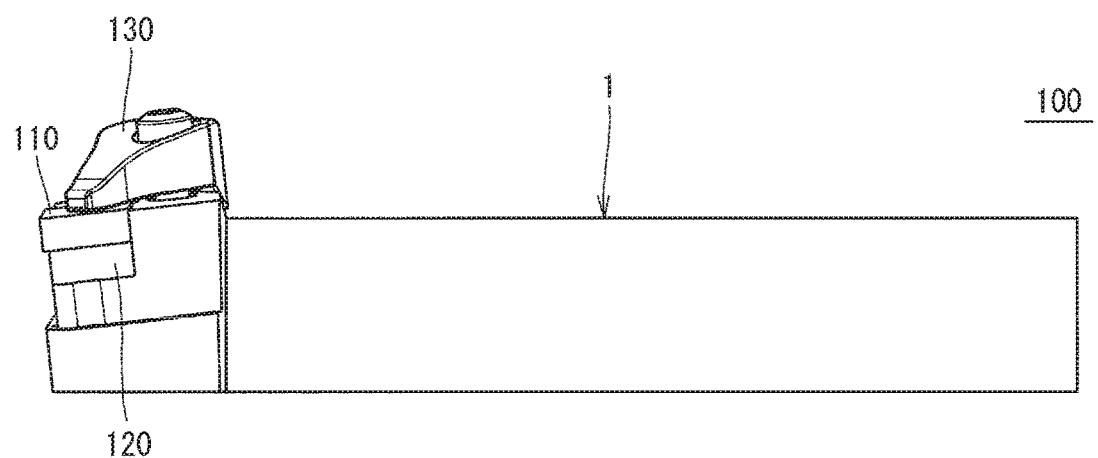
FIG. 10 is a side view illustrating a cutting tool according to a non-limiting aspect of the present disclosure.

The cutting tool 100 in the non-limiting aspect of the present disclosure is a cutting tool for use in a turning process, and includes a holder 1 and an insert 110 as illustrated in FIG. 10.

The cutting tool 100 in the non-limiting aspect of the present disclosure includes the holder 1 having high strength and high cooling function by a coolant. This leads to improved tool life of the cutting tool 100 and good cutting performance.

Figure 12:
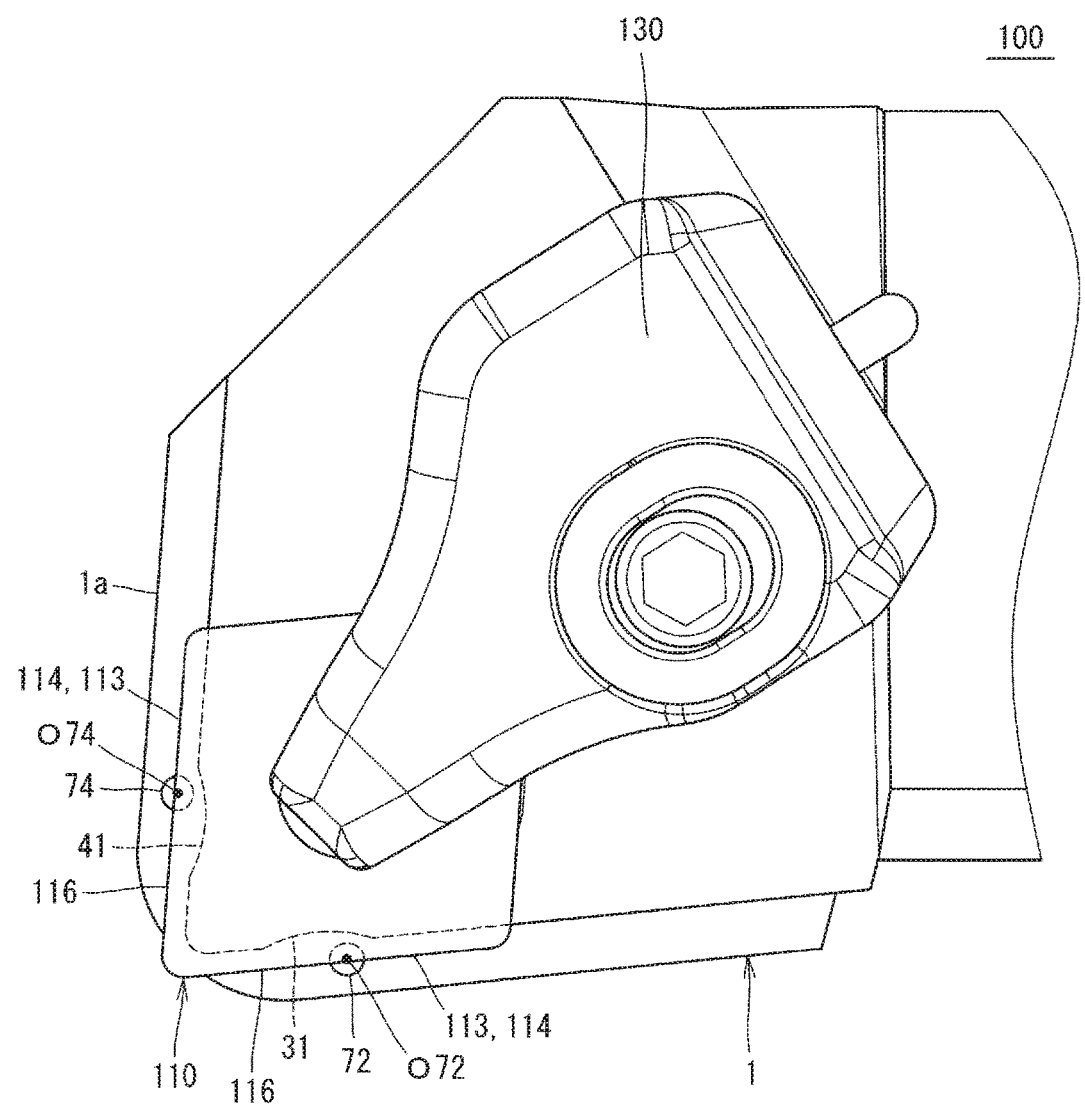
FIG. 12 is a top view enlargedly illustrating a side of the first end of the cutting tool holder in the cutting tool in FIG. 10.

As illustrated in FIG. 12, a part of the first outflow port 72 may be located more inward of the insert 110 than an outer edge 116 of the insert 110 in the top view. When satisfying this configuration, the coolant passing through a central axis O711 of an outflow region 711 (refer to FIG. 3) can be suitably sprayed to the insert 110. Specifically, the coolant passing along a side of an outer periphery of the outflow region 711 is sprayed from the holder 1 and is thereafter easy to diffuse outward. The coolant passing through the central axis O711 of the outflow region 711 is difficult to diffuse even after being sprayed from the holder 1 and flows along a desired outflow direction. The coolant passing through the central axis O711 of the outflow region 711 has therefore a relatively high coolant density after being sprayed from the holder 1. With the non-limiting aspect of the present disclosure, part of the coolant sprayed from the first outflow port 72, whose coolant density is relatively high, can be suitably sprayed to the insert 110, thereby enhancing the cooling effect by the coolant. The coolant passing through the central axis O711 of the outflow region 711 has a relatively high coolant density and therefore has relatively high injection force. This leads to further enhanced cooling effect by the coolant. Alternatively, a part of the second outflow port 74 may also be located more inward of the insert 110 than the outer edge 116 of the insert 110 in the top view. The term "inward of the insert 110" denotes a direction toward an interior of the insert 110.

As illustrated in FIG. 12, a center O72 of the first outflow port 72 may be located more inward of the insert 110 than the outer edge 116 of the insert 110 in the top view. When satisfying this configuration, a pull-out width of the first portion 6 from the first side surface 3 is suitably reducible while suitably supplying the coolant to the side surface 113 of the insert 110. The holder 1 is consequently applicable to a wider range of cutting processes. A center O74 of the second outflow port 74 may also be located more inward of the insert 110 than the outer edge 116 of the insert 110 in the top view.

Figure 11:
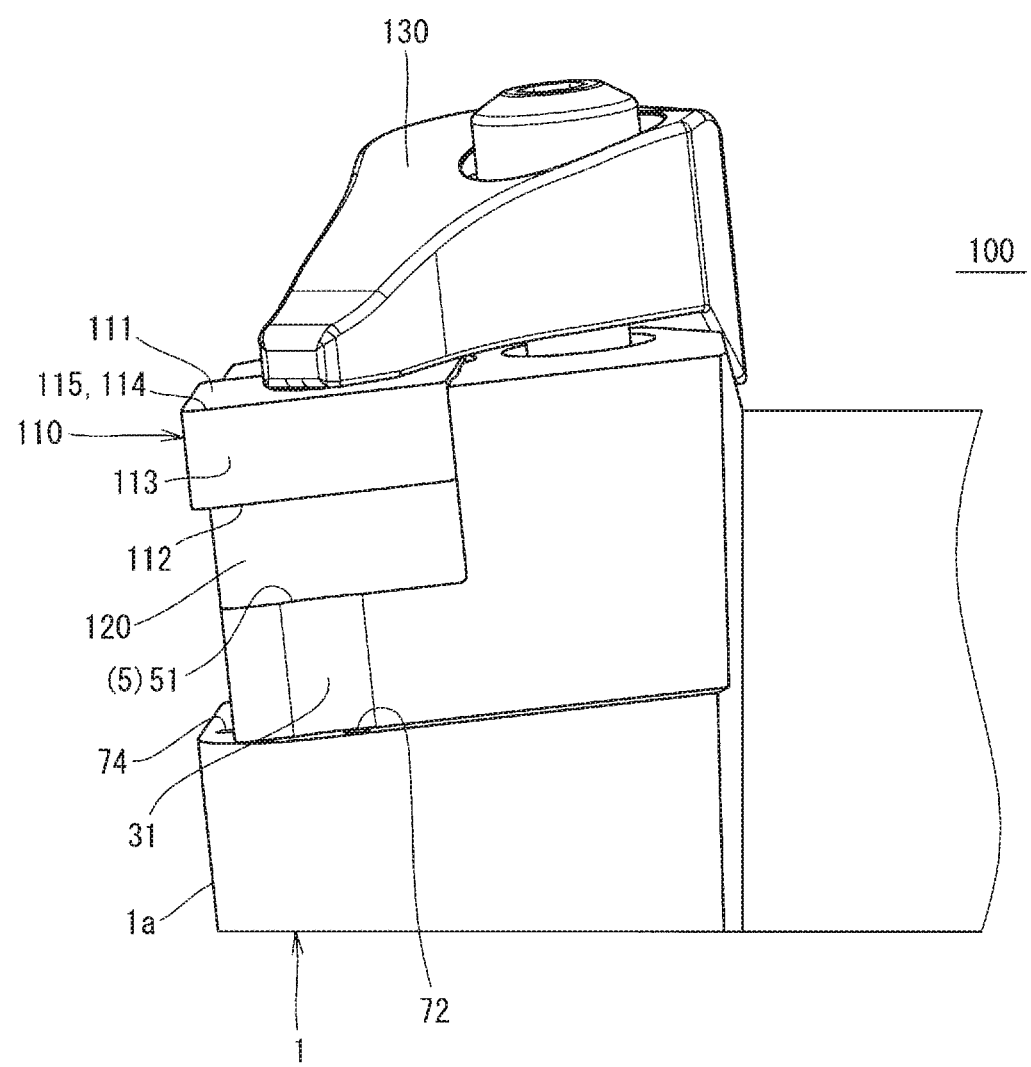
FIG. 11 is a side view enlargedly illustrating a side of a first end of a cutting tool holder in the cutting tool in FIG. 10.

The insert 110 is located at the pocket 5 of the holder 1 as illustrated in FIG. 11. The insert 110 may be located at the pocket 5 with a sheet member 120 interposed therebetween according to a non-limiting aspect of the present disclosure. In other words, the cutting tool 100 may further include the sheet member 120 located between the insert 110 and the pocket 5. With this configuration, a fracture of the insert 110 is less likely to cause damage to the holder 1. For example, cemented carbide is usable as a material of the sheet member 120. The composition of the cemented carbide is described in detail below when the material of the insert 110 is described later. Alternatively, the insert 110 may directly be located at the pocket 5 without interposing the sheet member 120 therebetween.

The insert 110 has a plate shape and includes the upper surface 112, the side surface 113, and the cutting edge 114 according to a non-limiting aspect of the present disclosure.

The upper surface 111 and the lower surface 112 are quadrangular-shaped surfaces. The quadrangular shape may be approximately a quadrangular shape and may not be a strict quadrangular shape. The upper surface 111 and the lower surface 112 may have other shape instead of the quadrangular shape. Examples of other shape include triangular shape, pentagonal shape, hexagonal shape and octagonal shape. At least a part of the upper surface 111 functions as a rake surface through which chips flow during a cutting process.

The side surface 113 is a surface which is located between the upper surface 111 and the lower surface 112 and connects to each of the upper surface 112 and the lower surface 112. The side surface 113 is constituted by four surface regions correspondingly to four side parts of each of the upper surface 111 and the lower surface 112. At least a part of the side surface 113 functions as a flank surface during the cutting process.

The cutting edge 114 is located in at least a part of a ridge part 115 where the upper surface 111 intersects with the side surface 113. The cutting edge 114 is located throughout the ridge part 115 according to a non-limiting aspect of the present disclosure. The insert 110 is located at the pocket 5 in a state in which the cutting edge 114 is protruded at a side of a first end 1a of the holder 1.

For example, cemented carbide or cermet is usable as a material of the insert 110. Examples of the cemented carbide include WC—Co, WC—TiC—Co and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co. The cermet is a sintered composite material obtainable by compositing metal into a ceramic ingredient. Examples of the cermet include ones which are composed mainly of a titanium compound, such as titanium carbide (TiC) or titanium nitride (TiN).

A surface of the insert 110 may be coated with a coating film. Examples of composition of the coating film include titanium carbide (TiC), titanium nitride (TiN), titanium carbonitride (TiCN) and alumina ($Al_2O_3$). For example, a chemical vapor deposition (CVD) method or a physical vapor deposition (PVD) method is usable as a method of depositing the coating film.

Dimensions of the insert 110 are, for example, settable to the following values. A length of one side of the quadrangular shape in the upper surface 111 and the lower surface 112 is, for example, 3-54 mm. A thickness of the insert 110 between the upper surface 111 and the lower surface 112 is, for example, 1-10 mm. The insert 110 may be either a positive type or a negative type.

The cutting tool 100 further includes a clamp member 130 as a fixing member for fixing the insert 110 to the pocket 5. The fixing member may be other fixing member instead of the clamp member 130. Examples of other fixing member include a screw.

The holder 1 in the first non-limiting embodiment is used as a holder in the non-limiting aspect of the present disclosure illustrated in FIGS. 10 to 12. Alternatively, the holder 20 in the second non-limiting embodiment may be used as a holder in other non-limiting aspects of the present disclosure.

<Method of Manufacturing Machined Product>

A method of manufacturing a machined product according to a non-limiting aspect of the present disclosure is described in detail below with reference to FIGS. 13 to 15.

Figure 13:
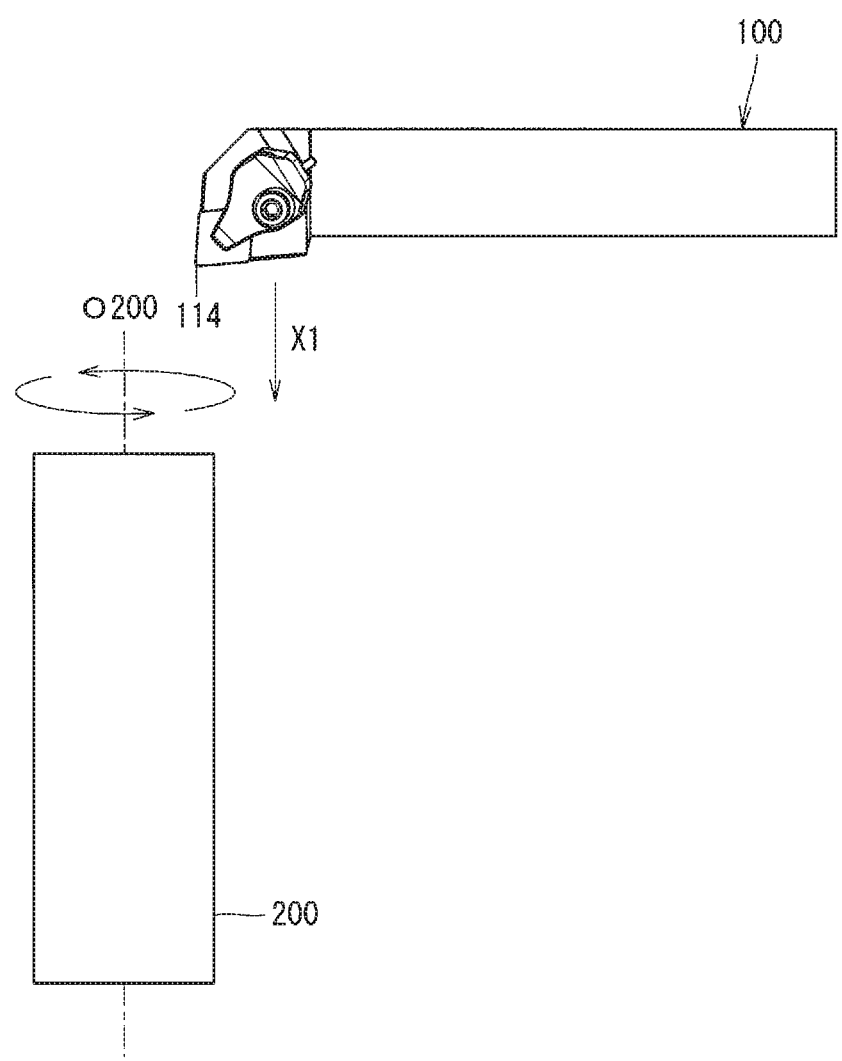
FIG. 13 is a schematic diagram illustrating a step in a method of manufacturing a machined product according to a non-limiting aspect of the present disclosure.
Figure 14:
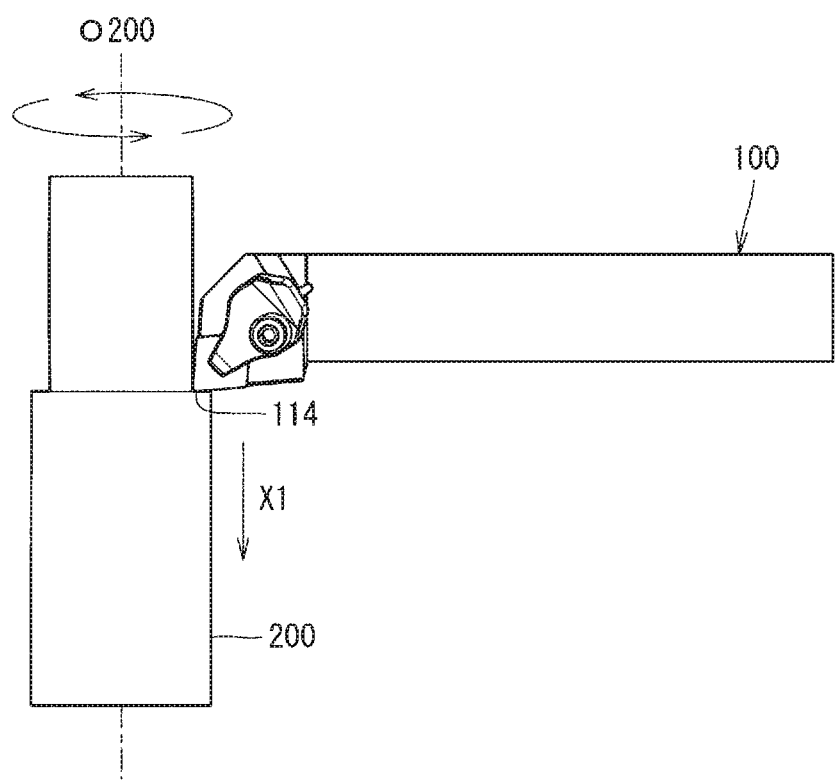
FIG. 14 is a schematic diagram illustrating a step in the method of manufacturing a machined product according to a non-limiting aspect of the present disclosure.
Figure 15:
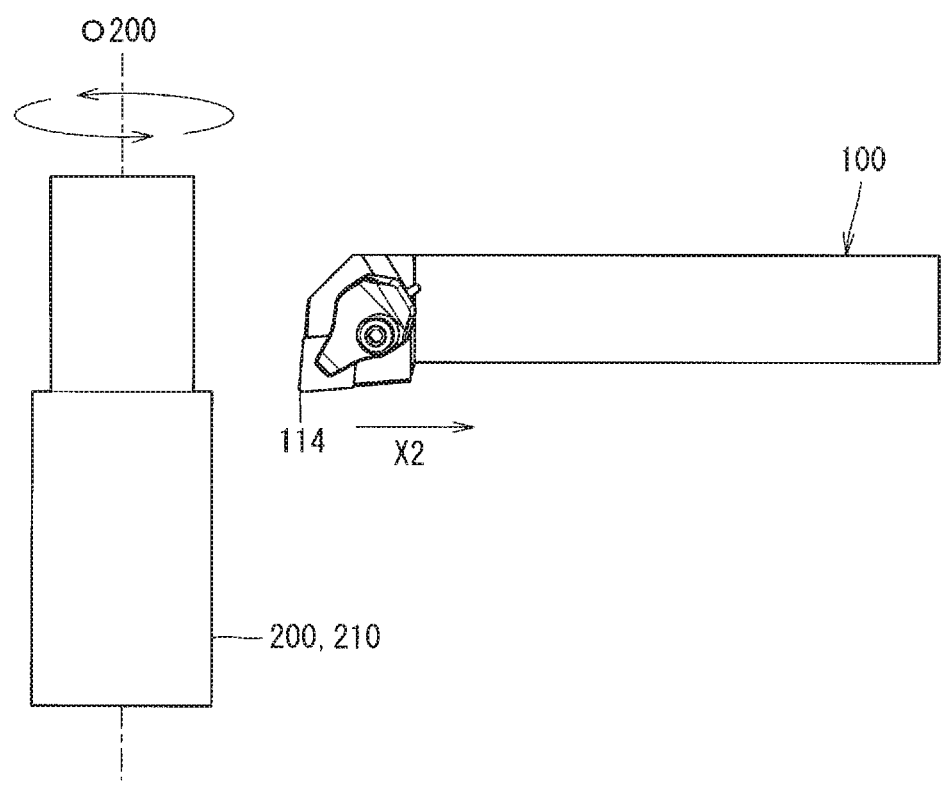
FIG. 15 is a schematic diagram illustrating a step in the method of manufacturing a machined product according to a non-limiting aspect of the present disclosure.

The method of manufacturing a machined product in the non-limiting aspect of the present disclosure includes the following steps of:

(1) rotating a workpiece 200 as illustrated in FIG. 13;

(2) bringing the cutting tool 100 into contact with the workpiece 200 being rotated as illustrated in FIG. 14; and (3) moving the cutting tool 100 away from the workpiece 200 as illustrated in FIG. 15.

Specifically, the workpiece 200 is firstly rotated around its rotation axis O200 as illustrated in FIG. 13. Examples of material of the workpiece 200 include carbon steel, alloy steel, stainless steel, cast iron and nonferrous metals.

The cutting tool 100 is then relatively brought near the workpiece 200 being rotated by moving the cutting tool 100 in an arrowed direction X1.

Subsequently, the workpiece 200 is cut out by bringing the cutting edge 114 in the cutting tool 100 into contact with the workpiece 200 being rotated as illustrated in FIG. 14. Alternatively, the workpiece 200 may be cut out while causing the coolant to flow out from the first outflow port 72 and the second outflow port 74.

Finally, the cutting tool 100 is relatively moved away from the workpiece 200 to obtain a machined product 210 by moving the cutting tool 100 in an arrowed direction X2 as illustrated in FIG. 15.

With the method of manufacturing a machined product in the non-limiting aspect of the present disclosure, a cutting process can be carried out in a state in which the coolant is suitably sprayed to the insert 110. This leads to a long tool life of the cutting tool 100 and enhanced machined surface accuracy of the machined product 210. Thus, the machined product 210 is manufacturable with high accuracy and at high efficiency.

Although the machined product 210 is obtainable by moving the cutting tool 100 in the non-limiting aspect of the present disclosure as illustrated in FIGS. 13 to 15, the non-limiting aspects of the present disclosure are not limited thereto. For example, the workpiece 200 may be brought near the cutting tool 100 in the step (1). Similarly, the workpiece 200 may be moved away from the cutting tool 100 in the step (3). When the cutting process is continued, it is necessary to repeat the step of bringing the cutting edge 114 into contact with different portions of the workpiece 200, while the workpiece 200 is kept rotating.

While the non-limiting embodiments and non-limiting aspects in the present disclosure have been illustrated and described above, the present disclosure is not limited to the above non-limiting embodiments or non-limiting aspects of the disclosure. It is, of course, possible to make any arbitrary ones insofar as they do not depart from the gist of the present disclosure.

Singular forms "a", "an" and "the" in the entirety of the present disclosure include plural forms thereof unless clearly indicated not being so from the context.

DESCRIPTION OF THE REFERENCE NUMERALS 1 cutting tool holder
  1a first end
  1b second end
2 upper surface
3 first side surface
  31 first recess
    31a first end part
    31b second end part
4 second side surface
  41 second recess
    41a third end part
    41b fourth end part
5 pocket
  51 mounting part
6 first portion
  61 outer edge
  62 first region
    621 outer edge
  63 second region
    631 outer edge
  64 boundary part
7 flow path
  7a inflow port
  7b outflow port
  71 first flow path
    711 outflow region
  72 first outflow port
  73 second flow path
    731 outflow region
  74 second outflow port
  75 main flow path
8 second portion
  81 outer edge
10 head
11 shank
12 lower surface
20 cutting tool holder
100 cutting tool
  110 cutting insert
    111 upper surface
    112 lower surface
    113 side surface
    114 cutting edge
    115 ridge part
    116 outer edge
  120 sheet member
  130 clamp member
200 workpiece
210 machined product

What is claimed is:

1. A cutting tool holder, comprising:
an upper surface;
a first side surface;
a second side surface adjacent to the first side surface;
a pocket opening into the upper surface, the first side surface, and the second side surface;
a first portion located lower than the pocket and protruded outward from the first side surface; and
a flow path comprising an inflow and an outflow,
wherein
the first side surface comprises a first recess,
the flow path further comprises a first outflow port opening into the first portion as the outflow, and a first flow path extending from the first outflow port into the holder, and
the first outflow port is located at a region of the first portion corresponding to the first recess.

2. The cutting tool holder according to claim 1, wherein a part of the first outflow port is located in the first recess in a top view.

3. The cutting tool holder according to claim 1, wherein the first recess comprises a first end part and a second end part, the first end part located at a side closer to the second side surface than the second end part that is located at a side away from the second side surface in a top view, and
the first outflow port is located closer to a side of the second end part than a midpoint of a straight line connecting the first end part and the second end part in the top view.

4. The cutting tool holder according to claim 1, wherein the first recess has a curvilinear shape in a top view.

5. The cutting tool holder according to claim 1, wherein the first recess has a circular arc shape in a top view.

6. The cutting tool holder according to claim 1, wherein the first flow path comprises an outflow region extending from the first outflow port and located at the first portion, and
the outflow region is inclined upward as going toward the second side surface.

7. The cutting tool holder according to claim 6, wherein the first recess extends in a first direction from the first portion toward the pocket in a plan view of the first side surface, and
the first direction in the first recess intersects with a second direction in which the outflow region is inclined in the plan view of the first side surface.

8. The cutting tool holder according to claim 1, wherein the first portion comprises a region in which a distance between the first side surface and an outer edge of the first portion decreases as going toward the second side surface in a top view.

9. The cutting tool holder according to claim 1, wherein the first portion comprises a first region and a second region, the second region connecting to the first region and located farther from the second side surface than the first region, and
a distance between the first side surface and an outer edge of the first region decreases as going toward the second side surface, and a distance between the first side surface and an outer edge of the second region is kept constant in a top view.

10. The cutting tool holder according to claim 1, further comprising:
a second portion located lower than the pocket and protruded outward from the second side surface,
wherein
the second side surface comprises a second recess,
the flow path further comprises a second outflow port opening into the second portion as the outflow port, and a second flow path extending from the second outflow port into the holder, and the second outflow port is located at a region of the second portion corresponding to the second recess.

11. A cutting tool, comprising:
the cutting tool holder according to claim 1, and
a cutting insert located at the pocket.

12. The cutting tool according to claim 11, wherein
a part of the first outflow port is located more inward in the cutting insert than an outer edge of the cutting insert in a top view.

13. The cutting tool according to claim 12, wherein
a center of the first outflow port is located more inward in the cutting insert than the outer edge of the cutting insert in the top view.

14. A method of manufacturing a machined product, comprising:
rotating a workpiece;
bringing the cutting tool according to claim 11 into contact with the workpiece being rotated; and
moving the cutting tool away from the workpiece.

15. The cutting holder according to claim 1, wherein
the first portion is also located lower than the first side surface and protrudes beyond the first side surface.

* * * * *